March 20, 1951  F. C. THOMPSON  2,545,754
DELAYED PULSE RADAR NAVIGATION APPARATUS
Filed July 25, 1947  4 Sheets-Sheet 2

Inventor
F. C. Thompson
By
Attorney

March 20, 1951  F. C. THOMPSON  2,545,754
DELAYED PULSE RADAR NAVIGATION APPARATUS
Filed July 25, 1947  4 Sheets-Sheet 3
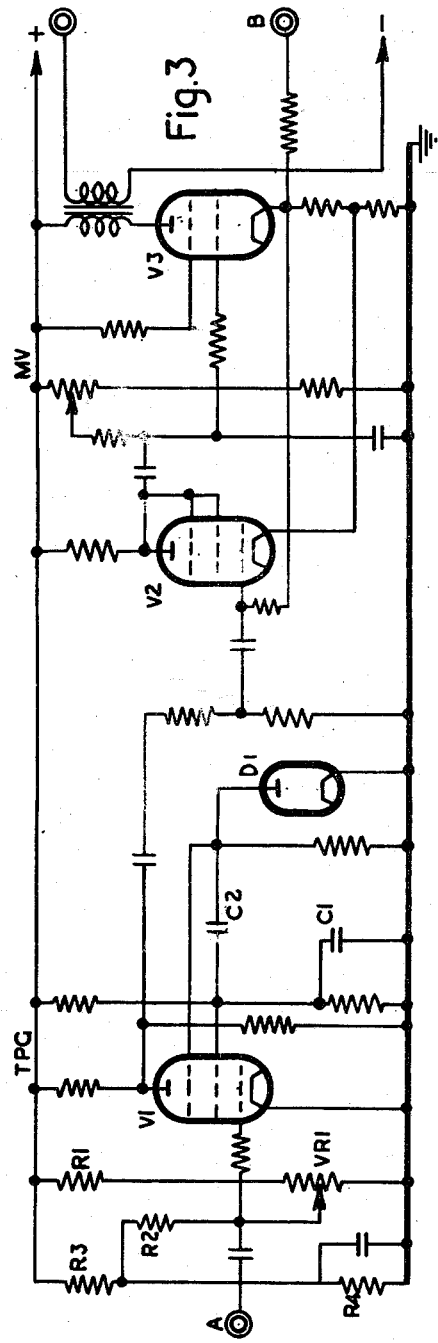
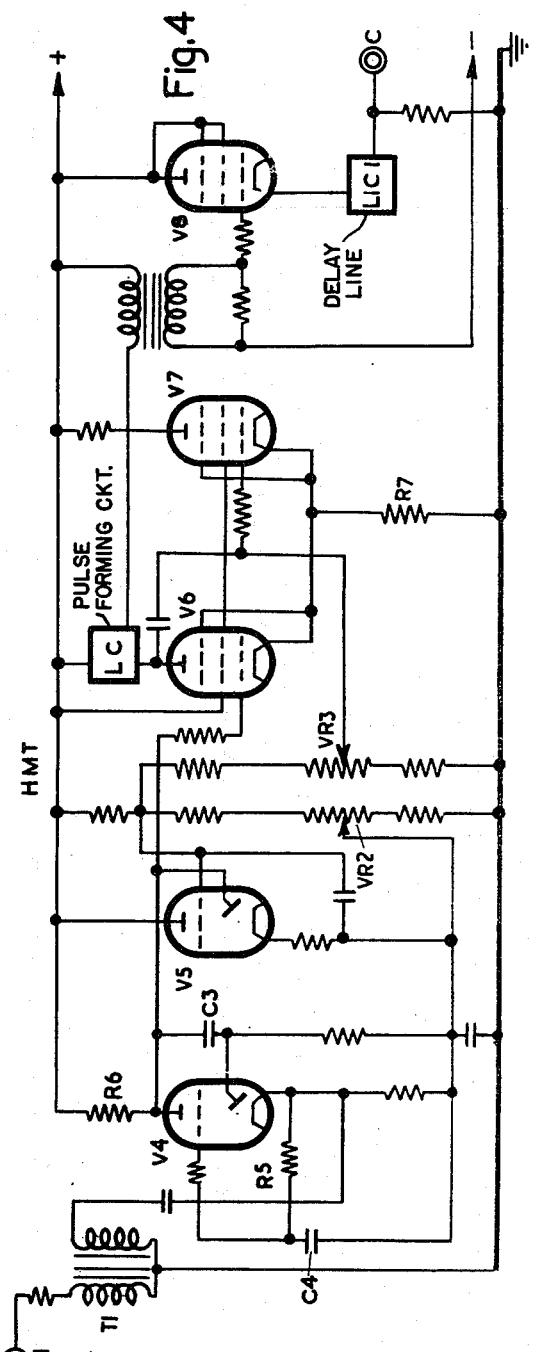
Inventor
F. C. Thompson
By
Attorney

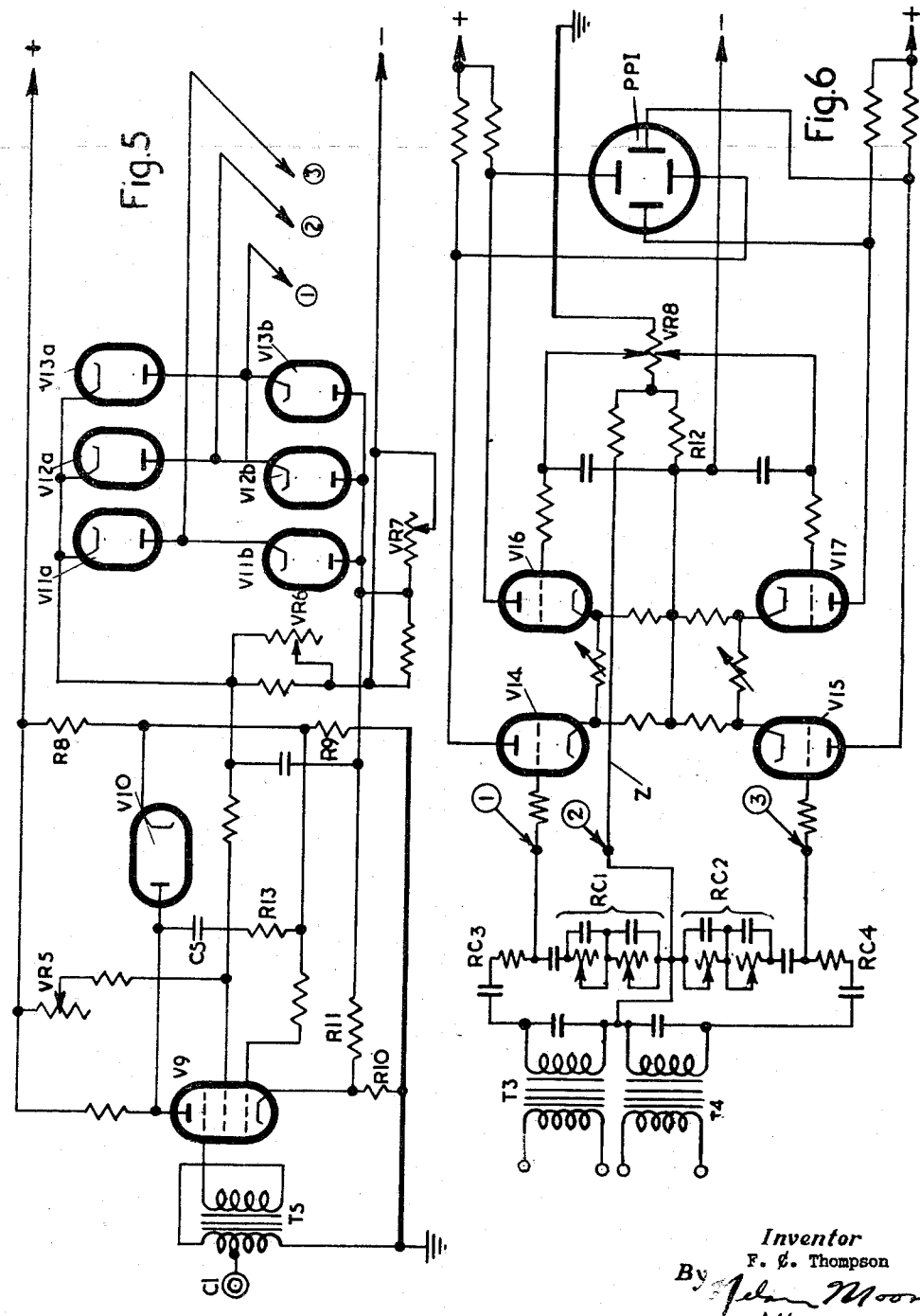

Patented Mar. 20, 1951

2,545,754

UNITED STATES PATENT OFFICE 2,545,754

DELAYED PULSE RADAR NAVIGATION APPARATUS

Frederick Charles Thompson, Danbury, England
Application July 25, 1947, Serial No. 763,604
In Great Britain July 20, 1945

Section 1, Public Law 690, August 8, 1946
Patent expires July 20, 1965

6 Claims. (Cl. 343—11)

This invention relates to improvements in navigating apparatus of the kind in which the terrain being navigated is scanned by a pulse-modulated radio beam and echoes of the pulses are displayed on a cathode ray tube in a manner such as to present a map-like picture of said terrain. A cathode ray tube employed in this manner is known as a plan position indicator.

The invention is concerned with reducing a particular form of distortion of the display which occurs when such apparatus is airborne. Briefly, an example of such an apparatus functions as follows:

The transmitting aerial, which usually also acts as the receiving aerial, is adapted to emit a narrow beam which at any instant covers a small sector of the terrain in question. The cathode ray tube is provided with a radial time base which is triggered by a transmitted pulse, or vice-versa, and as successive echoes of the pulse are received they are caused to brighten the trace from the centre of the tube outwards. By causing the aerial and the radial time base to rotate in synchronism and by repeating the process of transmitting a pulse and displaying the echoes along the radial trace for each small sector, a complete picture of the surrounding terrain is painted on the screen of the tube, assuming the afterglow time of the screen to be comparable with the time taken for the aerial to make one revolution.

Such an apparatus installed at or near ground level gives a true scale picture of the surrounding terrain on the screen of the cathode ray tube. When airborne, however, distortion is introduced due to the time taken for the pulses to reach the ground and return as echoes. For example, in the case of a ground installation, echoes from objects immediately surrounding the aerial are received more or less instantaneously and since the radial scan of the cathode ray tube time base starts as the transmitter fires these echoes appear substantially at the centre of the screen. In an airborne installation no echoes are received until the radial scan has moved outwardly from the centre of the screen a distance proportional to the height of the aircraft and consequently features on the ground vertically below the aircraft appear not at the centre of the tube but on a circle which increases in size as the height of the aircraft increases, leaving a dead area at the centre of the display. The size of the area and the distortion introduced become considerable when the aircraft reaches a height which is no longer negligible compared with the distance represented by a radius on the display. For instance, if the radius of the screen represents ten miles on the ground and the aircraft is flying at a height of five miles, the ground return ring, as the said circle is called, is half the radius of the screen.

The object of the present invention is to eliminate the ground return ring in apparatus of the kind set forth and to this end according to the invention, means are provided for synchronising the instant each radial sweep starts from the centre of the tube with the instant of receipt of the first echo from said terrain of a transmitted pulse associated with said sweep.

The start of the time base may be said to be delayed from the instant of transmission of a pulse until the instant of receipt of the first echo thereof.

According to another aspect of the invention means are provided for initiating each radial time base sweep at an instant after the transmission of a respective pulse determined by the height of the apparatus above said terrain.

The timing of the first echo and the timing of the start of the radial time base may be compared on the screen of a second cathode ray tube and means may be provided for adjusting the timing of the start of the time base to obtain coincidence of the indication.

The comparison of the timing of the first echo and of the start of the time base may be effected for example, by displaying the said echo as a deflection of a line trace on said second tube in one direction and the start of the time base as a deflection in the opposite direction.

The deflection or marker pulse which indicates the start of the time base is advantageously used to trigger the radial time base generating circuit.

In order to enable the nature of the invention and in what manner the same is to be performed to be more readily understood reference is directed to the accompanying drawings in which—

Figures 3 to 6 are circuit diagrams of the said embodiment.

Figure 1:
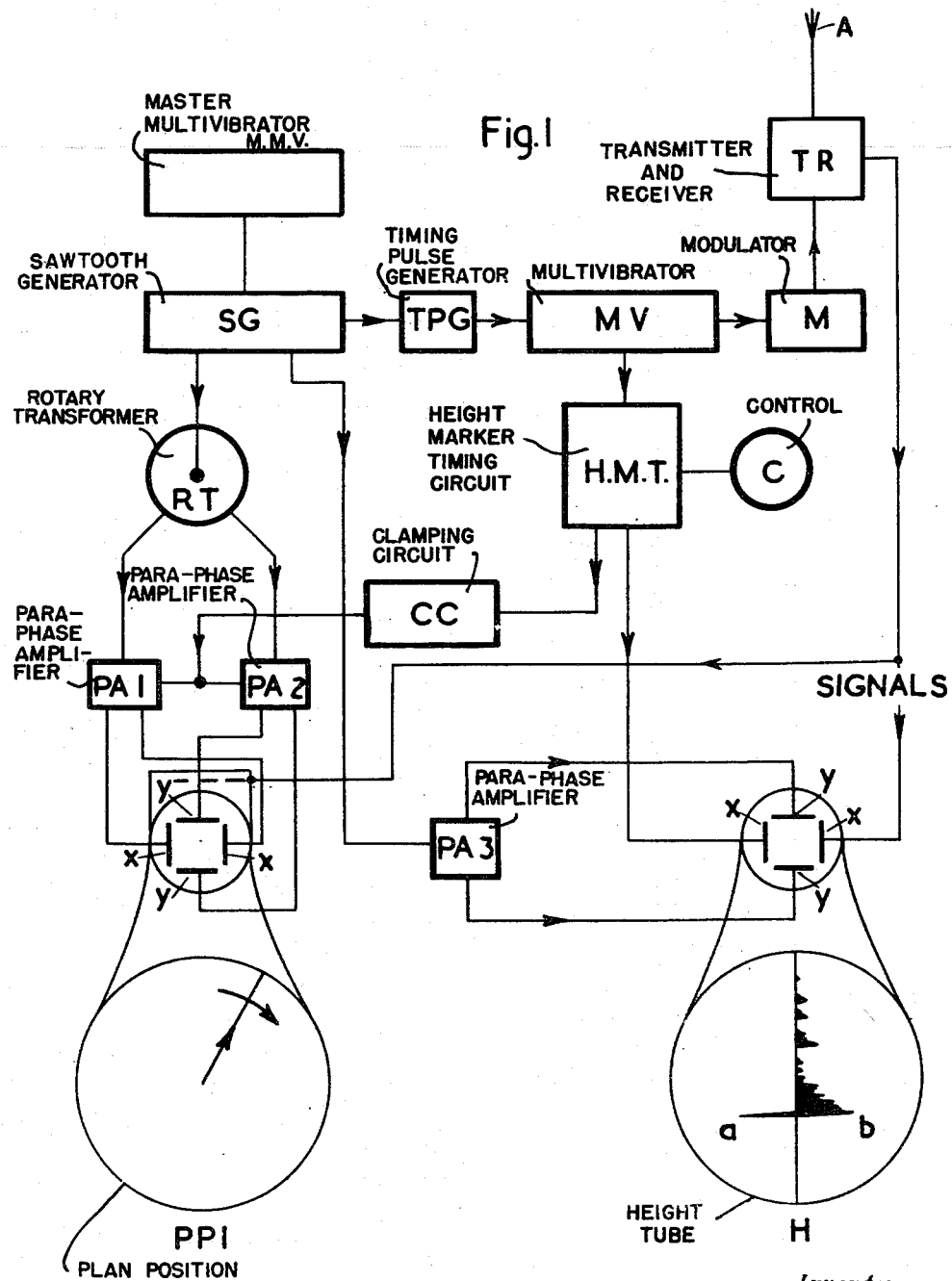
Figure 1 is a schematic block diagram illustrating one practical embodiment of the present invention applied to the relevant circuits of a navigating apparatus of the kind set forth.

In Figure 1, the plan position indicator PPI is the cathode ray tube adapted to give the map-like display in question. A height tube H is a further cathode ray tube provided with a linear time base and adapted to indicate echo time, i. e. range, by lateral deflections of the trace. The echo time with which this invention is principally concerned is that of the first ground echo, which is a function of the height of the aircraft.

The radial time base of the PPI tube originates from a sawtooth generator SG controlled by a master multi-vibrator MMV. The sawtooth waveform is fed to the rotor of a rotary transformer RT which has stators in quadrature and these outputs are applied through paraphase amplifiers PA1 and PA2 respectively to the X and Y deflector plates of the PPI tube. The result is a radial time base rotating in synchronism with the rotor of the rotary transformer RT, and, if the aerial device A is mounted on or turns with the rotor shaft of the transformer, the beam emitted by the aerial will also rotate in synchronism with the radial time base.

The receiver which detects and amplifies the echo signals and modulates the intensity of the radial trace is combined with the transmitter to form a unit TR. A multi-vibrator MV controls the modulator M of the transmitter. This multi-vibrator MV is triggered by a timing pulse generator TPG which is controlled by the sawtooth generator SG so that the multi-vibrator MV is synchronised with the master multi-vibrator MMV. Apart from controlling the modulator M, the multi-vibrator MV is adapted to deliver a synchronising pulse, every time the transmitter fires, to a height marker timing circuit HMT. This circuit is adapted to produce a height marker pulse lagging on said synchronising pulse by a variable time determined by the setting of a control C. The height marker pulse is fed to the left hand X plate of the height tube H and appears as a deflection $a$ to the left of the vertical trace. The time base for the vertical trace of the height tube is derived from the sawtooth generator SG and suitably amplified by a paraphase amplifier PA3. By altering the control C, this deflection $a$ can be made to move up or down the trace.

The echo signals from the receiver (the same signals as are used to modulate the beam intensity of the PPI tube) are fed to the right hand X plate of the height tube H and appear as deflections to the right of the trace generally as shown. When the apparatus is airborne no deflections appear for some distance up the trace and then there is a pronounced series of deflections $b$ which are the ground echoes. The first or lowermost of these is the echo from the ground immediately below the aircraft and its distance up the trace is a function of the height of the aircraft. If then the control C is adjusted until the deflection $a$ is level with the lowest deflection $b$ the delay introduced by the height marker timing circuit HMT also becomes a function of the aircraft height.

The height marker pulse is also fed to a clamping circuit CC adapted to control the paraphase amplifiers PA1 and PA2 of the PPI tube. The arrangement is such that the amplifiers PA1 and PA2 are inoperative and no trace appears on the PPI tube until the clamping circuit CC is triggered by the height marker pulse. Therefore, by maintaining the adjustment of the control C so that the height marker $a$ is always level with the first ground return $b$, the radial time base of the PPI tube starts at the instant the first ground echo is received and the object of the invention, namely, the elimination of the ground return ring, is achieved.

Figure 2:
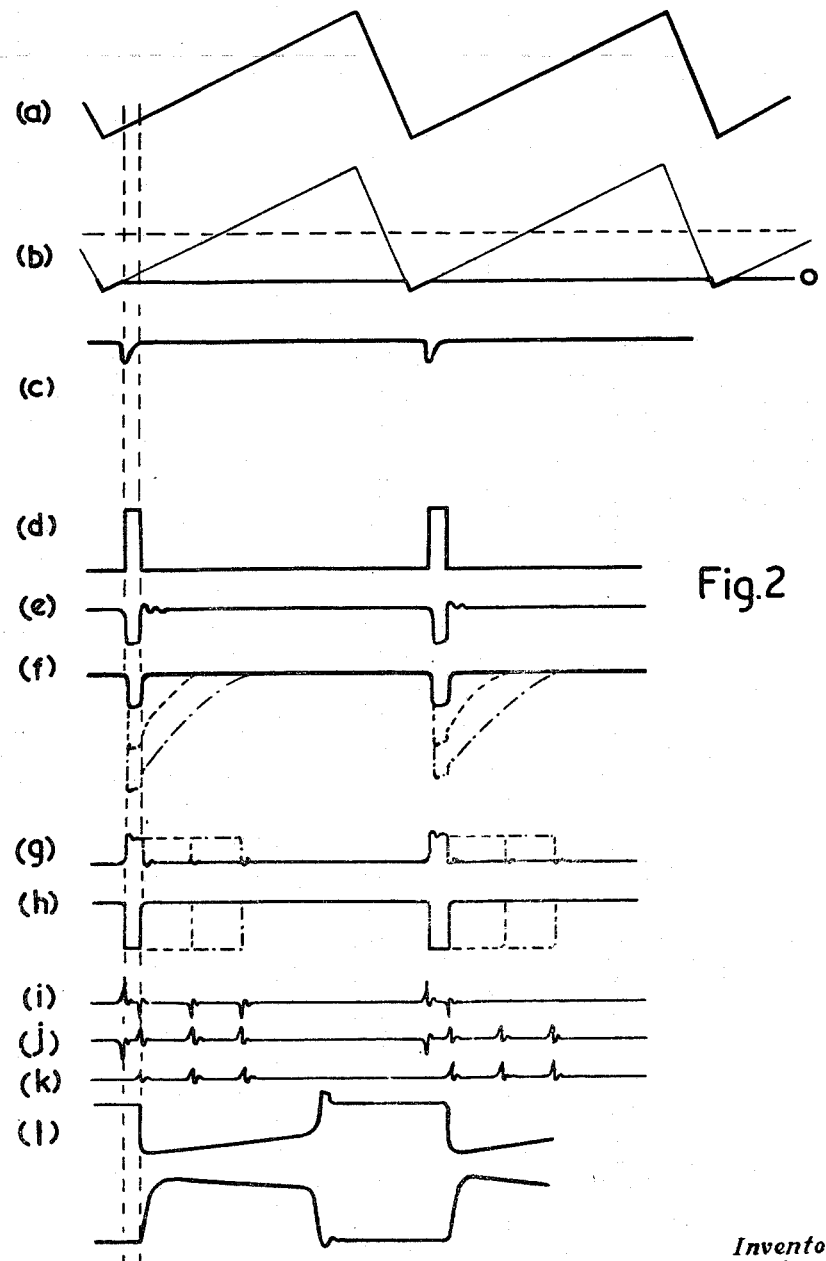
Figure 2 is a series of wave form diagrams.

Certain of the circuits will now be described in greater detail. The sawtooth generator (of any suitable known form) is adapted to deliver an output waveform substantially as shown in Fig. 2a. This waveform is applied to the timing pulse generator TPG and multivibrator MV at the terminal A shown in Fig. 3. Valve V1 is a timing valve which develops a negative pip at its anode when carried into conduction by the sawtooth wave applied to its grid and the timing of the pipe relatively to the sawtooth can be adjusted by means of the variable resistance VR1 which, in conjunction with the resistance R1, controls the positive D. C. potential of the grid about which the sawtooth swings. Fig. 2b shows the waveform at the grid of V1 nominally centred about a small D. C. level but actually cut off at 0 volts due to grid current. Anode current flows as the grid is raised above cut-off by the sawtooth wave and the anode potential falls as shown in Fig. 2c. (Cut-off is only just below 0 volts due to the low anode potential and consequent short grid base.) The screen potential does not drop immediately, but after a short interval determined by the condenser C2, which has first to charge negatively through the cathode-screen impedance of the valve. The suppressor is normally at 0 volts, due to the diode D1, but is tied to the screen by the condenser C2 and therefore is driven negative when the screen potential falls. This immediately cuts off the anode current and the anode potential rises sharply to its normal value. The anode waveform is thus a series of negative pips occuring at a point on a sawtooth waveform determined by the variable resistance VR1. In so far as the present invention is concerned the adjustment of VR1 is purely arbitrary. The negative autobias which develops on the grid condenser due to grid current through the grid stopper is substantially counter-acted by the bleeder R2 connected to the potential divider R3, R4.

The negative-going pips from the anode of V1 are fed to the grid of V2 which together with V3 constitutes the multi-vibrator MV which is free running at a repetition frequency slightly less than that of the master multi-vibrator MMV (Fig. 1) but which locks to the master frequency under the control of said negative pips. A negative going $20\mu$ sec. rectangular pulse is obtained from the anode of V3 and is used to develop a trigger pulse which fires the transmitter on the back edge of the $20\mu$ sec. pulse.

A similar, but positive-going, $20\mu$ sec. pulse (Fig. 2d) is delivered from the cathode of V3 at terminal B and is used to develop the height marker previously referred to. Terminal B is connected to terminal B1 of Fig. 4 which is the height marker timing circuit HMT of Fig. 1.

Valve V4 is the actual height marker timing valve and is a diode-triode with a common cathode. The $20\mu$ sec. pulse is applied to the primary of a pulse transformer T1 and appears at the secondary as a negative-going pulse with an oscillation due to "ringing" at its back edge (Fig. 2e). This latter pulse is applied to the cathode of V4. Normally the grid, the diode anode, and the cathode are returned to a positive potential determined by the height control variable resistance VR2 and the anode to a higher positive potential. The triode is therefore normally cut-off by grid current bias but the diode is just conducting and condenser C3 is charged. The leading edge of the applied pulse drives the cathode negative to the grid which does not follow owing to the long time constant of C4R5. The triode therefore passes grid current and a heavy anode current, the condenser C3 discharges, and the anode voltage falls. At the end of the pulse period the cathode rises to the potential of the grid, the condition of auto-bias is restored and anode current ceases but the anode voltage does not immediately rise again to the maximum value determined by the limiter valve V5 since condenser C3 is discharged and requires to be charged through the anode load R6. The delay is determined by the normal difference in potential between the anode and the cathode. That of the anode is fixed by V5 and that of the cathode by the variable resistance VR2 which therefore constitutes the control C described with reference to Fig. 1. This maximum delay occurs when the slider of VR2 is set for minimum potential and must be at least equal to the echo time of the first ground return when the aircraft is at its ceiling. Fig. 2f shows the waveform at the anode of V4 when VR2 is set for zero height (full lines), medium height (broken lines) and maximum height (chain lines). It will be noticed that the oscillations at the back edge of the pulse in Fig. 2e is not transmitted to the anode. This is due to the action of the diode portion which prevents the lower plate of C3 from rising above the potential of the slider of VR2.

Valves V6 and V7 form a cathode coupled flip-flop. V6 grid is subject to the anode potential of V4. The arrangement is such that a rectangular negative-going pulse (Fig. 2h) appears at the anode of V7 and a similar, but positive-going, pulse (Fig. 2g) appears at the anode of V6. These pulses commence on the leading edge of the pulse from the anode of V4 (Fig. 2f) and ceases when the potential of said anode raises V6 grid above cut-off. The cut-off level of V6 grid depends on the current passed by V7 through the common cathode load R7 which current is controlled by the potential on V7 grid as derived from the variable resistance VR3. This variable potential is arranged to be a few volts below the limited maximum anode potential of V4 and provides a pre-set zero control for initial calibration purposes.

A pulse forming line LC in the anode circuit of V6 converts the square wave (Fig. 2g) to positive and negative pips (Fig. 2i) which are inverted by transformer T2 and applied to the negatively biased grid of a cathode follower V8. The bias is just sufficient to hold the valve cut-off until a positive going signal is applied. Consequently only the positive going pip of the waveform shown in Fig. 2j appears at the cathode of V8 and this (Fig. 2k) is fed through a 2 μ sec. delay line L1C1 to the output terminal C. The delay is introduced to compensate for the lag which occurs in practice between the back edge of the 20 μ sec. pulse of multi-vibrator MV and the firing of the transmitter. The output from terminal C is amplified and applied to the left hand X plate of the height tube H (Fig. 1) where it appears as a deflection a to the left of the vertical time base trace. By adjusting the variable resistance VR2 (control C) the deflection is caused to move up and down the trace and when deflection a is level with the lowest deflection b the timing of the height marker is synchronous with the receipt of the first ground return from each transmitted pulse.

The height marker from terminal C is used to trigger the radial time base of the PPI tube (Fig. 1), by means of a relaxation-relay stage comprising valves V9 and V10 (Fig. 5) and a series of diode clamps V11, V12, and V13 each of which comprises two diode sections which for convenience are illustrated separately and notated V11a, V11b, etc. Valves V9 to V13 thus constitute the clamping circuit CC of Fig. 1. The relaxation-relay state (valves V9 and V10) is described in copending United States patent application Serial No. 762,375, in the name of F. C. Williams.

Figure 6 is a circuit diagram of the paraphase amplifiers PA1 and PA2 for the radial time base of the PPI tube shown in block form in Fig. 1. The quadrature sawtooth outputs from the rotary transformer RT are applied to the primaries of transformers T3 and T4 the secondaries of which are connected to the grids of valves V14 and V15 which are respectively cathode coupled to valves V16 and V17 to constitute two paraphases amplifiers connected to the deflector plates of the cathode ray tube PPI.

As hereinafter stated, the invention eliminates the distortion due to the delay in receiving the first ground echoes after the transmission of a pulse but if a linear radial time base is employed there will still be distortion since the echo time is a function of slant distance and not distance measured in the plane of the terrain. A circuit arrangement suitable for correcting such distortion is advantageously embodied in each of the grid circuits of valves V14 and V15 shown in Fig. 6. They consist of resistance capacity networks RC1 and RC2 connected between the grids of the valves V14 and V15 and the common line z of the secondary windings of transformers T3 and T4. These networks RC1 and RC2 require a constant charging voltage and therefore the sawtooth outputs from the transformers T3 and T4 are differentiated by means of series resistance-condenser combinations RC3 and RC4 to give substantially square waveforms for application to the networks RC1 and RC2.

The action of the circuit of Fig. 5 in clamping and unclamping the potentials at the three points 1, 2, and 3, indicated by the arrows in Fig. 6, will now be described. Normally, until a height marker pulse is fed to terminal C1 (Fig. 5), the suppressor grid of V9 is at earth potential, the anode is at a limited positive potential determined by the diode V10 and potential divider R8R9, the screen is at a positive potential less than the anode as determined by a potential divider comprising variable resistances VR5 and VR6, the control grid is at anode potential, and the cathode is at some positive potential. The potential divider comprising VD5 and VR6 is connected across positive and negative lines and the strapped cathodes of the diodes V11, V12, and V13 are connected to a negative point on said potential divider. Under these stable conditions cathode current raises the cathode potential sufficiently to cut off anode current by means of suppressor grid bias, since the suppressor grid is earthed through transformer T5, and all the cathode current is coming from the screen which is at its minimum potential. The strapped anodes of the diodes are also arranged to be at the same negative potential as the strapped cathodes by connection to a negative point on the potential divider comprising resistances R10, R11 and VR7. The three mutually connected anodes and cathodes of the diodes are connected, as indicated by the arrows 1, 2 and 3, to the grid circuits of valves V14 and V15 (Fig. 6) and to the common line z respectively. This common line z is held at the same negative potential as the strapped anodes and cathodes of the diodes V11, V12 and V13 by means of a potential divider comprising resistances R12 and VR8 across the negative line and earth. The grids of V14 and V15 cannot, therefore, rise or fall from the negative potential of the strapped anodes and cathodes of the diodes because otherwise diode conduction occurs in one or other half of the diodes. Consequently, when the circuit V9—V10 is in its stable condition a charging square wave developed in either resistance-condenser combination RC3 or RC4, as the result of a rising sawtooth voltage delivered by transformer T3 or T4 respectively, has no effect on the potential of the grid of V14 or V15 due to the clamping action of the diodes.

When a height marker pulse is applied to terminal C1 (Fig. 5) the suppressor grid of V9 goes positive and the suppressor bias is removed. Anode current then flows and screen current falls, giving a fall in anode potential and a sharp rise in screen potential. The fall in anode potential is transmitted through condenser C5 to the control grid and cathode current and potential falls. By this time the height marker will have ceased but the return of the suppressor grid to earth potential no longer cuts off anode current since the cathode potential has dropped. The result is that anti-phase square waves are developed at the cathode and screen of V9 (Figs. 2l and 2m respectively). The strapped cathodes of the diodes are therefore carried positive, and the anodes carried negative and all three diodes are cut-off. The grids of V14 and V15 are then free to move and a radial scan is initiated on the cathode ray tube PPI.

The anti-phase square waves on the cathode and screen of the phantastron valve V9 are arranged to cut-off during the flyback of the radial time base so that the grids of the paraphase amplifiers V14 and V15 are clamped again preparatory to the build up of a further charging voltage for the networks RC1 and RC2. The duration of said anti-phase square waves is determined by the time constant of C5R13 since the condenser C5 slowly discharges through R13 as the anode potential falls and gradually raises the potential of the control grid and cathode until suppressor grid bias cuts off the anode current.

I claim:

1. An aircraft radar system in which the terrain beneath an aircraft is scanned from a substantial altitude, a pulse modulated transmitter-receiver, a rotating directive aerial device, a cathode ray tube, a time base generator connected to said aerial device, synchronizing means connected to said aerial device and said time base generator, locking means connected to said tube and generating recurrent voltage locking fronts of the same recurrence frequency as the pulses transmitted by said transmitter-receiver and each front substantially coincident with the instant of return of the first echo signal from said terrain, and control means connected to and releasing said locking means for initiating a radial time-base sweep by each of said recurrent voltage locking fronts.

2. An aircraft radar system comprising means for irradiating the terrain beneath the aircraft with an exploring beam of pulse-modulated radio energy, a first cathode ray tube, means for deflecting the electron beam of said first cathode ray tube by echo signals received in response to the transmitted pulses in a manner to indicate the range of the objects giving rise to said echo signals, means for generating a train of marker pulses each pulse of which is synchronized with a transmitted pulse and is delayed with respect thereto, means for deflecting the electron beam of said first cathode ray tube by said marker pulses, means for adjusting the delay between the transmitted pulses and the marker pulses to bring the marker pulse on the screen of the first cathode ray tube into coincidence with the echo signal of shortest range, a second cathode ray tube, means for producing rotating radial time-base sweeps on the screen of said second cathode ray tube, means for intensity modulating said radial time-base sweeps with said echo signals, and means for initiating each of said radial time-base sweeps coincidently with a marker pulse.

3. An aircraft radar system according to claim 2 and wherein said means for producing rotating radial time-base sweeps comprises two paraphase amplifiers, means for feeding sawtooth voltage waveforms thereto, limiting means for limiting the response of said paraphase amplifiers to said sawtooth voltage waveforms and means for inhibiting the operation of said limiting means for a predetermined period after each of said marker pulses.

4. An aircraft radar system according to claim 3 wherein said means for feeding sawtooth voltage waveforms to said paraphase amplifiers comprises two resistance-capacity networks and means for feeding sawtooth voltage waveforms to said resistance capacity networks to compensate for distortion of the radial time base sweeps relative to distance measured in the plane of said terrain.

5. An aircraft radar system according to claim 2 and wherein said means for generating a marker pulse comprises a triode thermionic valve, means for feeding a square wave voltage impulse to the cathode thereof to cause anode current to flow therein for the duration of the impulse, a resistive anode load producing a drop in anode potential during the flow of anode current and means including a capacitor for causing a current to flow through the anode load for a predetermined period after the cessation of said impulse.

6. An aircraft radar system in which the terrain beneath the aircraft is scanned from a substantial altitude, a pulse modulated transmitter-receiver, a rotating directive aerial device, a cathode ray tube, a time base generator connected to said aerial device, synchronising means connected to said aerial device and said time base generator, locking means connected to said time base generator to convey thereto recurrent voltage locking fronts of the same recurrence frequency as the pulses transmitted by said transmitter-receiver and to initiate a radial time-base sweep by means of each of said voltage locking fronts, and control means connected to and releasing said locking means to render each of said voltage locking fronts substantially coincident with the return of the first echo signal from said terrain.

FREDERICK CHARLES THOMPSON.

REFERENCES CITED

The following references are of record in the file of this patent:

UNITED STATES PATENTS

| Number | Name | Date |
|---|---|---|
| 2,409,456 | Tolson et al. | Oct. 15, 1946 |
| 2,416,088 | Deerhake | Feb. 18, 1947 |
| 2,422,204 | Meacham | June 17, 1947 |